Sept. 24, 1957 J. L. MOODY ET AL 2,807,766
MULTIPLE VOLTAGE ELECTRIC MOTOR
Filed Sept. 28, 1954 5 Sheets-Sheet 1

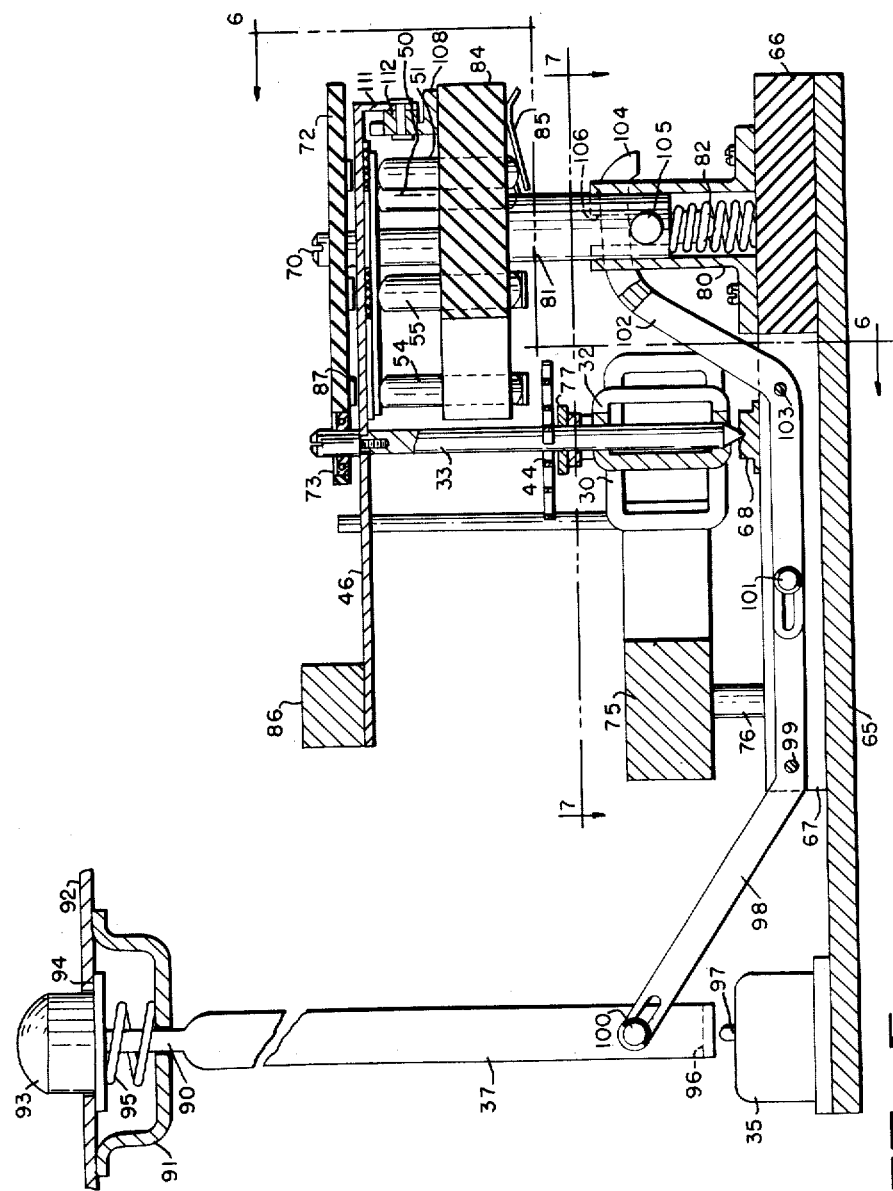

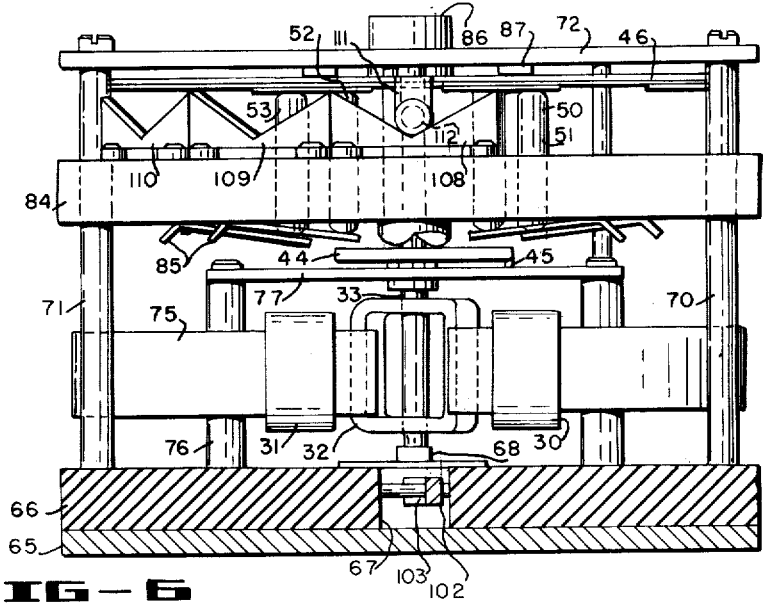
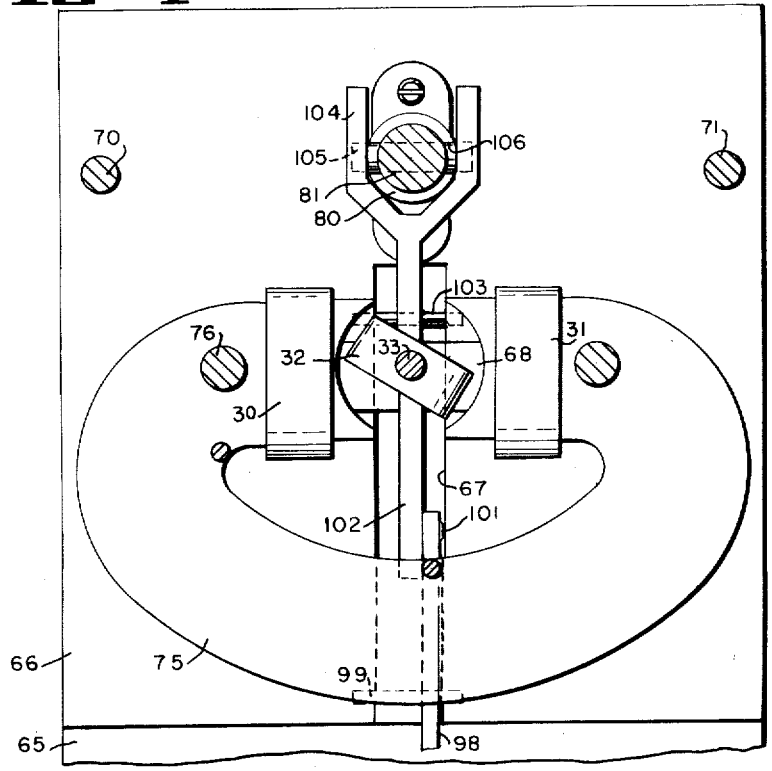

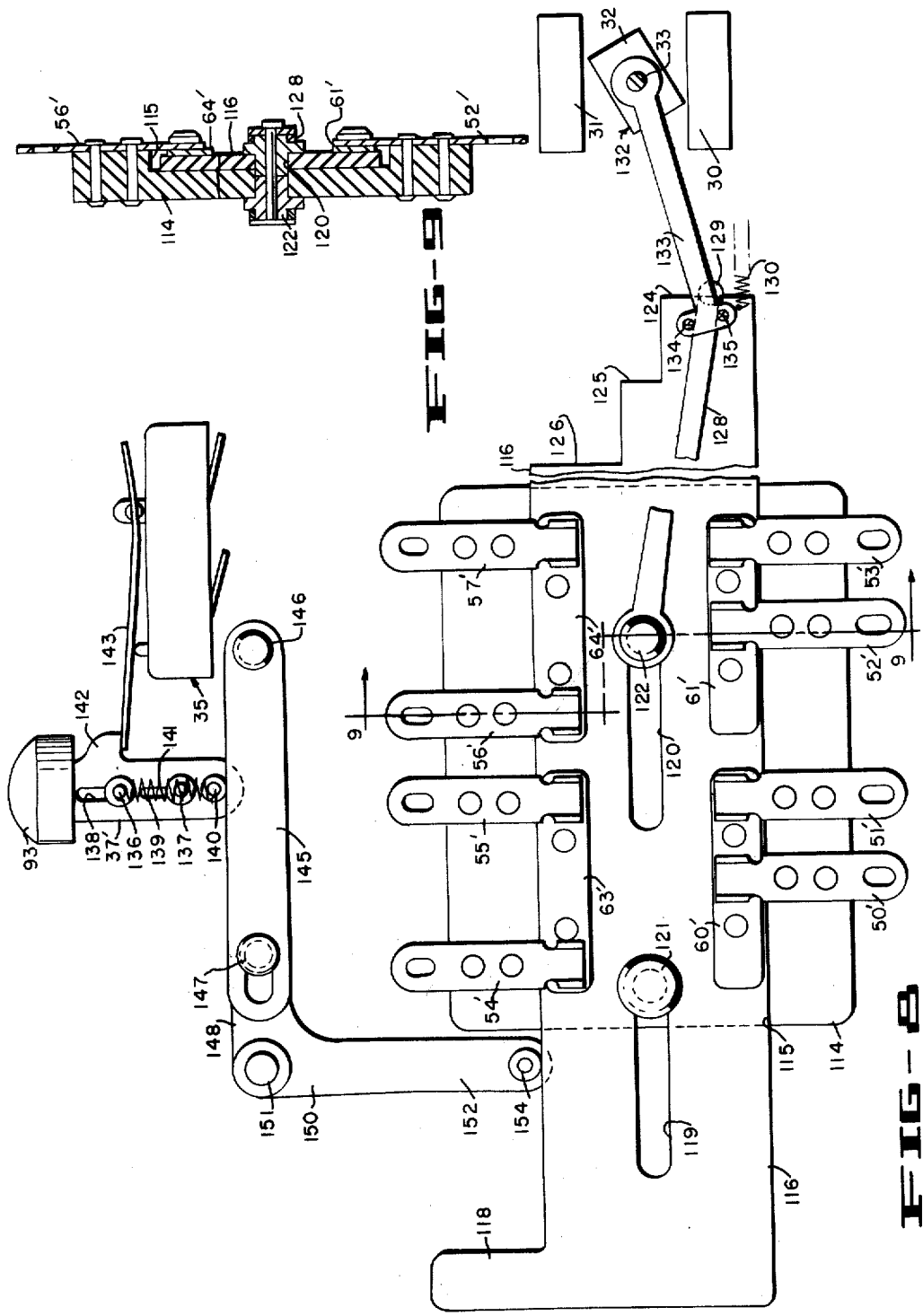

United States Patent Office 2,807,766
Patented Sept. 24, 1957

2,807,766

MULTIPLE VOLTAGE ELECTRIC MOTOR

John L. Moody and Bernard P. Silverman, Oakland, Calif., assignors to Friden Calculating Machine Co., Inc., a corporation of California Application September 28, 1954, Serial No. 458,870

11 Claims. (Cl. 318—252)

This invention relates to electric motors and current distributing switch mechanism therefor and more particularly to a motor arranged for operation under different voltage ranges and switch means effective to automatically condition the motor for operation under any one of the several voltage ranges to which the motor may be subjected.

In the use of electrically operated machines, such as portable office and business machines for example, and particularly where such machines are built for sale and use in different countries, it is necessary to compensate in some manner for the variations in the potential or voltage of the domestic electric current supplied to users in different places and different countries. For example, while alternating electric current supplied to users in the United States is nearly always at 110 or 220 volts, in different European and Asiatic countries the voltage of the domestic electric current may be any of a number of voltages in the range between 110 and 250 volts.

It is, of course, possible to provide a special motor assembly for each of several predetermined ranges within the overall voltage range but, if this is done, it is almost impossible to install the proper motor assemblies at the factory and it thus becomes necessary for the sales or service agencies in the different localities or countries to stock and install the motor assemblies. This is obviously an expensive and inconvenient arrangement. It is also possible to provide an assembly whereby the motor can be manually conditioned for operation within different voltage ranges, as disclosed in Patent No. 2,692,363, patented October 19, 1954, by John L. Moody and Morten P. Matthew for Variable Voltage Motor but this arrangement, while having material advantages over the method of supplying different or special motor assemblies for the different voltage ranges, has certain disadvantages in that the operator of the machine may not know the voltage of the current supplied or may neglect to adjust the motor assembly and thus operate the motor at the wrong adjustment for the current supply with consequent unsatisfactory operation of the machine or serious damage to the motor.

It is therefore among the objects of the present invention to provide an automatically adjusting, variable motor assembly which will automatically condition the motor for whatever voltage the current supply may have; which is rendered effective to automatically condition the motor by simple action of the machine operator, such as depressing a motor-adjusting key or push button; which is freed for instantaneous adjustment when the adjusting key or push button is depressed and is securely held in properly adjusted condition when the key or push button is released; which simultaneously connects the adjusting mechanism into and disconnects the motor from the energizing circuit when the adjusting mechanism is enabled and simultaneously connects the motor into and disconnects the adjusting mechanism from the energizing circuit when the adjustment has been made; which requires current for the adjusting mechanism only during the brief interval of time in which an adjustment is being made; which imposes no material electrical resistance in the motor circuit; and which is of small size and light weight so that it can be readily installed in a portable machine, and is of economical construction and not subject to malfunctioning in use.

Other objects and advantages will become apparent from a consideration of the following description and the appended claims in conjunction with the accompanying drawings wherein:

Fig. 5 is a cross-sectional view on the line 5—5 of Fig. 4;

Fig. 6 is a cross-sectional view on the line 6—6 of Fig. 5;

Fig. 7 is a cross-sectional view on the line 7—7 of Fig. 5;

Fig. 8 is an elevational view of a modified form of motor adjusting switch; and

Fig. 9 is a cross-sectional view on the line 9—9 of Fig. 8.

Figure 1:
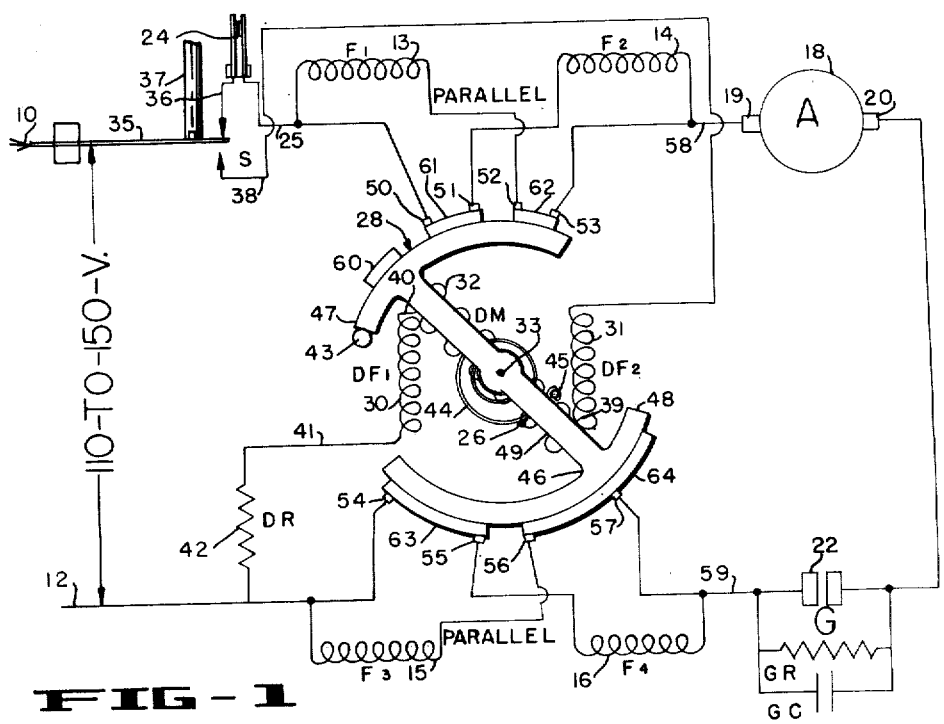
Fig. 1 is a diagrammatical illustration of an automatically adjustable, variable voltage motor assembly adjusted for a low voltage range.
Figure 2:
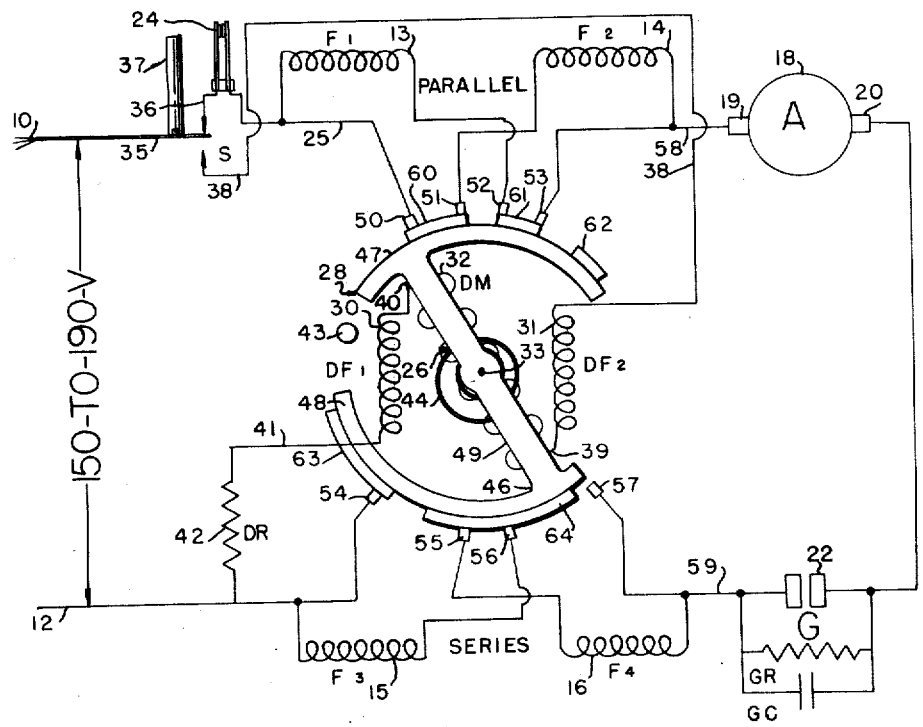
Fig. 2 is a view similar to Fig. 1 with the assembly adjusted for an intermediate voltage range.
Figure 3:
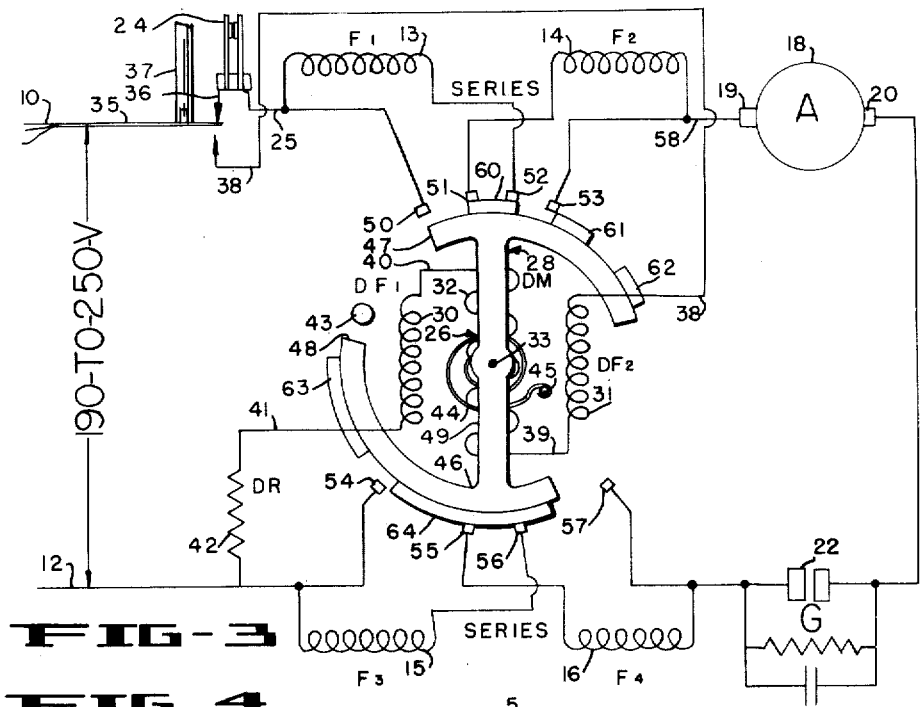
Fig. 3 is a view similar to Figs. 1 and 2 with the assembly adjusted for a high voltage range.
Figure 4:
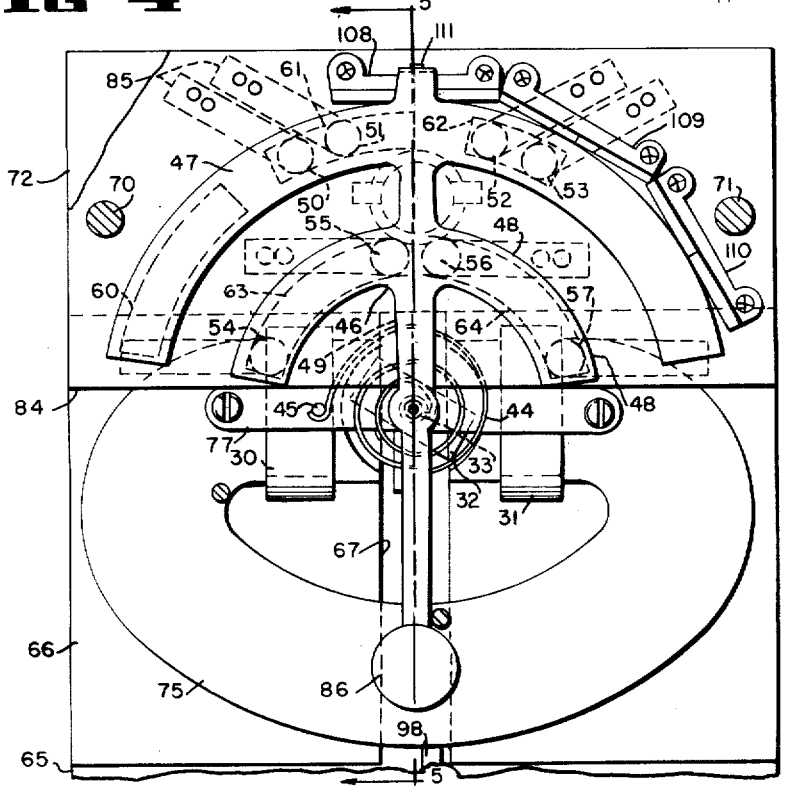
Fig. 4 is a top plan view with parts broken away and shown in cross-sections, of an automatic switch for conditioning an associated motor for operation in different voltage ranges of the motor energizing current.

With continued reference to the drawings, the assembly, as diagrammatically illustrated in Figs. 1, 2 and 3, includes a suitable power source, such as the two wires 10 and 12 of a two-wire extension cord one end of which is connected to the variable voltage motor assembly and the other end of which may be plugged into a conventional convenience outlet of a house wiring system in a manner well known to the art. The motor has two pair of field coils or windings mounted in a suitable stator structure with the windings of one pair designated at 13 and 14 and the windings of the other pair designated at 15 and 16. The motor also has an armature 18 connected in series with the field or stator windings by suitable brushes 19 and 20 and, in the arrangement illustrated, a governor 22 is connected in series with the motor armature "A," this governor being effective to interrupt the current supplied to the motor armature whenever the speed of the armature exceeds a predetermined value for which the governor is set. When the motor assembly is used in a portable office or business machine, such as an adding or calculating machine, the supply of current to the motor will normally be controlled by a motor-control switch 24 connected in series into the conductor 25 leading from the power wire 10 to the field windings of the motor, the switch 24 being closed to supply current to the motor when a machine-operating key, such as an addition, subtraction, multiplication, division, total or subtotal key, is depressed to establish an operating cycle of the machine, as is well known to the art.

The construction and arrangement of the motor is such that when the two field windings of each pair of such windings are connected parallel with each other, as shown in Fig. 1, the motor is conditioned for operation in a voltage range of from 110 to 150 volts, when the field windings of one pair are connected in parallel with each other and the field windings of the other pair are connected in series with each other, as shown in Fig. 2, the motor is conditioned for operation in a voltage range of from 150 to 190 volts and, when the two field windings of each pair of such windings are connected in series with each other, as shown in Fig. 3, the motor is conditioned for operation in a voltage range of from 190 to 250 volts, this arrangement being substantially the same as that disclosed in Patent No. 2,692,363, referred to above.

In order to automatically condition the motor for the several voltage ranges, as mentioned above, an electrodynamic device in the nature of a volt meter, generally indicated at 26, is provided and operatively connected to a three-position switch, generally indicated at 28, which is in turn electrically connected to the motor field windings 13 to 16, inclusive, in a manner such that, as the switch assumes its different positions, the field windings will be alternatively interconnected in the parallel and series relationships described above.

The electrodynamic device, as diagrammatically illustrated in Figs. 1, 2 and 3, includes a pair of stationary coils 30 and 31 mounted in spaced-apart and parallel relationship to each other, and a movable or partly rotatable coil 32 disposed between the two fixed coils 30 and 31 and symmetrically mounted on a shaft 33 which is suitably journalled on the fixed support or frame of the device, structures of suitable electrodynamic switch assemblies being shown in Figs. 4 to 9, inclusive, and subsequently described in detail.

A manually operated, single pole double throw switch 35 is interposed between the lead-in wire 10 and a conductor 36 leading to the side of the motor-controlled switch 24 opposite that to which the conductor 25 is connected and the switch 35 is normally closed with the conductors 10 and 36 so that the switch 24, when closed, is effective to energize the motor and establish an operating cycle of the machine. The switch 35 is movable by a manually operated device, such as the push button element 37, from its position connecting the lead-in wire 10 to the conductor 36 to its alternative position in which it disconnects the lead-in wire 10 from the conductor 36, thereby interrupting the energizing circuit to the motor, and connects the lead-in wire 10 to a conductor 38 which by-passes the motor windings and leads to one end of the fixed coil 31 of the electrodynamic device 26. A conductor 39 leads from the other end of the coil 31 to one end of the movable coil 32, a conductor 40 leads from the other end of the movable coil 32 to one end of the fixed coil 30, and a conductor 41 leads from the other end of the fixed coil 30 through a suitable resistance unit 42 to the lead-in wire 12 of the extension cord so that, when the switch 35 is moved to connect the lead-in wire 10 to the conductor 38, the coils 31, 32 and 30 are connected in series with each other and between the extension cord wires 10 and 12, the coils or windings of the electrodynamic device thus receiving current directly from the wires of the extension cord without the interposition of resistance by any part of the motor being connected in series with the device. The motor controlling switch 24 is also by-passed so that the energizing current is supplied to the electrodynamic device as long as the switch 35 is in contact with the conductor 38.

When current is thus supplied to the coils 30, 31 and 32 of the electrodynamic device, the movable coil 32 is urged to turn from a position determined by a fixed stop 43 at which its axis is disposed at a predetermined angle to the parallel axis of the windings 30 and 31 toward a position in which its axis is substantially parallel to the axis of the windings 30 and 31, this rotational movement of the coil 32 being resisted by one or more accurately adjusted springs 44, in the form of clock springs, each connected at one end to the shaft 33 and at its other end to a fixed pin or abutment 45. The adjustment of the spring or springs 44 is such that the winding 32 will assume definite angular positions relative to the windings 30 and 31 when the windings are subjected to definite predetermined voltages and, as the operating principles of electrodynamic volt meters of the character indicated are well known to the art, a more detailed description is considered unnecessary for the purposes of the present disclosure.

As diagrammatically illustrated, the three-position switch comprises a member 46 that is centrally mounted on the shaft 33 and has portions 47 and 48 of arcuate shape disposed in angularly spaced-apart relationship and coaxially of the shaft 33 and supported on the shaft by a diametrically disposed arm or spoke structure 49. It is assumed that the member 46 will take a definite angular position for each range of voltages to which the electrodynamic device 26 is subjected and the switch further includes spaced apart, fixed contacts 50, 51, 52 and 53 disposed along the outer edge of the arcuate portion 47 of the member 46, and contacts 54, 55, 56 and 57 spaced apart along the outer or peripheral edge of the arcuate portion 48. The contact 50 is connected to the conductor 25 and to the end of the field winding 13 to which this conductor is connected and the contact 52 is connected to the other end of the winding 13. The contact 51 between the contacts 50 and 52 is connected to one end of the field winding 14 while the contact 53 is connected to the other end of the winding 14 and to the conductor 58 which leads from the winding 14 through the armature 18 and governor 22 to the windings 15 and 16 and from these windings to the lead-in wire 12.

The contact 54 is connected to the lead-in wire 12 and to the side of the field winding 15 connected to this lead-in wire while the contact 56 between the contacts 55 and 57 is connected to the other end of the winding 15. The contact 55 between the contacts 54 and 56 is connected to one end of the winding 16 while the contact 57 is connected to the conductor 59 which leads from the governor 22 and is connected to the other end of the winding 16. The arcuately shaped portion 47 of the member 46 carries on its outer edge three spaced-apart conductor bars 60, 61 and 62 and the portion 48 carries on its outer edge two spaced-apart conductor bars 63 and 64.

The length and spacing of the conductor bars is such that when the member 46 is in the angular position corresponding to a voltage within the range from 110 to 150 volts impressed on the electrodynamic device 26, as shown in Fig. 1, the conductor bar 61 interconnects the contacts 50 and 51 and the conductor bar 62 interconnects the contacts 52 and 53 thus connecting the field windings 13 and 14 in parallel with each other and, at the same time, the conductor bar 63 interconnects the contacts 54 and 55 while the conductor bar 64 interconnects the contacts 56 and 57 thus also connecting the field windings 15 and 16 in parallel with each other. The motor is then conditioned for operation under a current voltage in the lower range of from 110 to 150 volts.

When a voltage in the intermediate range of from 150 to 190 volts is impressed on the electrodynamic device 26, as shown in Fig. 2, the movable switch member 46 is swung to the angular position, illustrated in Fig. 2, in which the conductor bar 60 interconnects the contacts 50 and 51 and the conductor bar 61 interconnects the contacts 52 and 53 thus maintaining the field windings 13 and 14 connected in parallel with each other. In this position of the member 46, however, the conductor bar 64 interconnects the contacts 55 and 56 while the contacts 54 and 57 are disconnected from any of the other contacts thereby interconnecting the field windings 15 and 16 in series with each other. This increase the electrical resistance of the motor field windings to an extent sufficient to condition the motor for operation under a voltage within the intermediate range between 150 and 190 volts.

When the electrodynamic device 26 is subjected to a voltage within the higher voltage range from 190 to 250 volts, as shown in Fig. 3, the movable switch member 46 is moved to the angular position shown in Fig. 3 in which the contacts 50 and 53 are disconnected from any of the other contacts and the contacts 51 and 52 are connected together by the conductor bar 60 thus connecting the field coils 13 and 14 in series with each other. At the same time, the contacts 54 and 57 remain disconnected from any of the other contacts while the contacts 55 and 56 remain connected together by the conductor bar 64 thus maintaining the field windings 15 and 16 connected in series with each other. Under these conditions, the windings of both pair of field windings are connected in series and the resistance of the motor field windings is thus increased to condition the motor for a voltage in the higher voltage range.

The switch 35 must, of course, be operated for each change in the movable switch member 46 by the electrodynamic device 26 and, when the switch 35 is released after the electrodynamic device has moved the movable switch member to its new position, the electrodynamic device is disconnected from the energizing circuit of the motor and the connection of the energizing circuit to the field and armature windings of the motor is restored.

The mechanical construction of an electrodynamic device and associated three-position switch for carrying out the above-described operation is illustrated in Figs. 4, 5, 6 and 7 and a somewhat modified form of electrodynamic device and switch assembly for carrying out the same operation is shown in Figs. 8 and 9.

Referring to Figs. 4, 5, 6 and 7, a flat base plate 65, which may be of rectangular shape, supports a base block 66 which may also be of rectangular shape and somewhat smaller than the base plate 65 so that, while it is substantially flush with three edges of the base plate it has one edge spaced from and substantially parallel to the corresponding edge of the base plate. This base block 66 is provided medially of its length with a deep notch or slot 67 extending inwardly thereof perpendicular to the edge of the base block spaced from the corresponding edge of the base plate 65 and is provided near the inner end of the notch 67 with a bearing boss 68 within which the lower end of the shaft 33 has a point or jewel bearing. Suitable posts 70 and 71 extend upwardly from the base block 66 intermediate the width and near the respectively opposite ends of the base block and these posts support a backing-up plate 72 of rectangular shape above and substantially parallel to the portion of the base block 66 beyond the inner end of the notch 67.

A bearing 73, mounted in an aperture in the plate 72, receives the upper end portion of the shaft 33 and assists in rigidly supporting the shaft in upright position for rotational movement about its longitudinal center line as an axis. The fixed coils 30 and 31 are disposed at respectively opposite sides of the shaft 33 and are supported on the base block 66 and, if desired, a metal core 75 of somewhat horseshoe shape may be provided to extend across the space between the coils 30 and 31 with one of its ends extending through the coil 30 and its other end extending through the coil 31. The core 75 may be supported on the base block 66 by suitable post structures 76 and the spaced apart and mutually opposed ends of the core are preferably concavely recessed to provide a space of somewhat cylindrical shape in which the movable coil 32 mounted on the lower portion of the shaft 33 is free to turn.

The posts 76 extend above the core 75 in spaced relationship to opposite sides of the shaft 33 and a bar 77 extends between and is secured to the upper ends of the posts 76 and supports the fixed pin or abutment 45 for the clock spring 44 which resists turning of the shaft 33 by the movable coil 32.

A tubular socket 80 is mounted at its lower end on the base block 66 at a location spaced from the inner end of the notch 67 in the base block and a post or plunger 81 extends into the open, upper end of the socket 80 and projects upwardly from the socket. A compression spring 82 is disposed in the socket 80 between the bottom end of the plunger 81 and the top of the base block 66 and a contact carrying plate 84 of electrically insulative material is mounted on the upper end of the plunger 81 and disposed substantially parallel to the base block 66. The contacts 50 to 57, inclusive, are in the form of elongated pins of electrically conductive material slidably mounted in apertures extending through the plate 84 and projecting above the plate substantially perpendicular thereto. Leaf springs, as indicated at 85, are disposed against the underside of the plate 84 and connected each at one end to the plate and each of these leaf springs has its free end disposed below the bottom end of a corresponding contact pin so that the springs resiliently hold the contact pins in a predetermined raised or upward position relative to the contact supporting plate 84. The springs also provide means to which the electrical conductors leading from the field windings of the motor are connected to provide electric connections between the ends of the field windings and the contact pins. It will be noted that the plate 84 is of partly circular shape and that the sets of contacts 50 to 53, inclusive, and 54 to 57, inclusive, are arranged in spaced-apart locations along two spaced-apart arcs disposed one within the other.

The member 46 is in the form of flat plate structure mounted on the shaft 33 immediately above the upper ends of the contact pins carried by the posts 70 and 71. The backing-up plate 72 carried by the posts 70 and 71. The two arcuate portions 47 and 48 of the member 46 extend along concentric, spaced-apart arcs and are both disposed at the same side of the shaft 33 while the portion of the member 46, extending to the opposite side of the shaft, carries at its distal end a counterweight 86 which counterbalances the weight of the portion of the member 46 including the arcuate portions 47, 48 and the contact bars 60 to 64, inclusive, carried thereby. The contact bars 60 to 64, inclusive, are on the bottom side of the plate structure 46 adjacent the upper ends of the contact pins 50 to 57, inclusive, and are positioned at the different positions of the member 46 to interconnect the several contact pins in the manner described above in connection with Figs. 1, 2 and 3. The backing-up plate 72 is disposed immediately above the upper side of the movable switch member 46 and is provided on its underside with spaced-apart studs 87 which contact the top surface of the member 46 and limit the upward movement of this member when the contact pins are forced upwardly against the undersurface of the member 46 by the compression spring 82 disposed between the bottom end of the plunger 81 and the base block 66.

The push button element 37 is illustrated as comprising an elongated bar having a reduced end portion 90 extending through an aperture in the bottom of a cup-shaped receptacle 91 mounted on the underside of a portion 92 of the associated machine housing or cover. The cover 92 is provided with an aperture receiving a push button 93 and the push button has at one end an annular flange 94 bearing against the underside of the cover 92 surrounding the push button receiving aperture therein to limit movement of the push button outwardly of the receptacle 91. A compression spring 95 surrounds the reduced portion 90 of the element 37 between the bottom wall of the receptacle 91 and the adjacent end of the push button 93 and resiliently urges the push button outwardly of the receptacle until the push button flange 94 engages the undersurface of the cover 92. At its opposite end the element 37 is provided with a perpendicularly directed foot 96 which is disposed in opposition to the outer end of the plunger or lever 97 of the switch 35 so that when the push button 93 is pushed inwardly of the receptacle 91 against the force of the spring 95, the foot 96 engages the switch lever 97 and changes the switch 35 from its contact with the conductor 25 to its contact with the conductor 38, as described above.

A lever 98 has an end portion thereof disposed within the elongated notch 67 in the base block 66 and is pivotally connected intermediate its length to the base block near the outer end of the notch 67 by a suitable pivot pin 99. The end of this lever 98 disposed outwardly of the notch 67 is pivotally connected to the push button element 37 by a pivotal connection 100 and the other end is pivotally connected by a pivotal and lost motion connection 101 to one end of a second lever 102 pivotally connected intermediate its length to the base block 66 near the inner end of the notch 67 by a pivot pin 103. A portion of the lever 102 at the side of the pivot pin 103 remote from the pivotal connection 101 extends upwardly from the base block 66 and is provided with a terminal yoke formation 104 extending partly around the upper end portion of the socket 80 above the base block 66. A pin 105 extends perpendicularly through the portion of the plunger 81 within the socket 80 and through diametrically opposite notches, as indicated at 106, in the socket and the yoke formation 104 rides on the end portions of the pin 105 projecting outwardly of the socket 80.

With this construction, when the push button 93 is depressed or pushed inwardly of the receptacle 91, the yoke formation 104 is forced toward the base block 66 moving the plunger 81 and contact supporting plate 84 away from the movable switch member 46 and freeing this member for movement by the electrodynamic device to a position corresponding to the voltage impressed on this device.

In order to definitely center the movable switch member 46 at definite positions for the different voltage ranges, V-shaped cams 108, 109 and 110 are disposed on the upper surface of the contact supporting plate 84 in end-to-end relationship along the outer edge of this plate and the movable switch member 46 is provided with a depending, terminal arm 111 carrying a roller 112 which engages in the upwardly opening V-shaped notches of the cams 108, 109 and 110. This construction is such that when the contact carrying plate 84 is moved downwardly by depression of the push button 93 the cams are moved downwardly below the roller 112 so that the movable switch member is free to move angularly without interference by the cams. When the push button is released and the spring 82 forces the plate 84 toward the backing-up plate 82 the roller 112 will be within the limits of one of the V-shaped cam notches and, as the plate 84 moves toward the plate 72 the roller will move to the bottom of the corresponding notch and will thus center the movable switch member 46 in the proper position for the corresponding voltage range.

The modified form of switch illustrated in Figs. 8 and 9 has a flat base block 114 of rectangular shape and a channel-shaped cross-section provided with a shallow groove 115 extending form one to the other and medially of the width thereof and a flat slide bar 116 slidably mounted in the groove 115 and extending outwardly of the opposite ends of the block 114 with its outer surface substantially flush with the surfaces of the portions of the block 114 at the opposite sides of the groove 115. The block 114 and the slide bar 116 are both formed of electrically insulative material and contacts, as indicated at 54', 55', 56' and 57', and are mounted on the portion of the block 114 at one side of the groove 115 in spaced-apart relationship to each other and extend perpendicular to the adjacent edge of the groove and over the adjacent portion of the outer surface of the slide bar 116. The contacts 54' to 57' are in the form of flat strips of resilient, electrically conductive material and similar contacts 50', 51', 52' and 53' are mounted on the portion of the block 114 at the opposite side of the groove 115 in spaced-apart relationship along this portion of the block and extend perpendicular to the adjacent edge of the groove and over the adjacent portion of the outer surface of the slide bar 116. Contact bars 63' and 64' are mounted on the outer surface of the slide bar 116 in end-to-end and spaced-apart relationship along the edge of the slide bar nearest the contacts 54' to 57' and in position to move under the ends of these contacts projecting over the adjacent portion of the slide bar and similar contacts 60' and 61' are mounted on the slide bar 116 along the edge thereof nearest the contacts 50' to 53', inclusive, in spaced-apart and end-to-end relationship along the corresponding edge of the slide bar and in position to move under the ends of the contacts 50' to 53' projecting over the adjacent portion of the slide bar.

The slide bar is provided at one end with a perpendicularly directed abutment formation 118 and at locations spaced apart along its length and medially of the width thereof with longitudinally extending slots 119 and 120. A guide pin 121 is secured to the block 114 within the groove 115 thereof and extends through the slots 119 in the slide bar and a similar guide pin 122 is secured to the block 114 within the grove 115 and extends through the slot 120 in the slide bar.

At its end remote from the abutment formation 118 the slide bar is provided with three stepped abutment surfaces 124, 125 and 126 extending transversely of the slide bar and spaced apart longitudinally thereof and extending in sequence across the width of the slide bar. An arm 128 is pivotally mounted at one end on the guide pin 122 and extends along the slide bar to the stepped end of the latter, carrying at its distal end a hook formation 129 which is alternatively engageable with the abutment surfaces 124, 125 and 126 to position the slide bar 116 in any one of three predetermined positions relative to the base block 114. A tension spring 130 is connected to the stepped end of the slide bar and extends outwardly longitudinally of the bar to resiliently urge the stepped abutment formations of the bar against the hook formation 129 of the arm 128.

An electrodynamic device, generally indicated at 132 and similar to the device illustrated in Figs. 4, 5, 6 and 7 and described above, is provided adjacent the stepped end of the bar 116 and the movable arm 133 of this device is connected to the link or arm 128 near the distal end of this link by having the distal end portion of the movable arm 133 overlap the distal end portion of the arm 128 and provided with pins 134 and 135 disposed at respectively opposite sides of the distal end portion of the arm 128.

With this arrangement, when the electrodynamic device is free to operate, it will position the hook or abutment formation 129 on the distal end of the arm 128 in opposition to one or the other of the steps 124, 125 and 126 corresponding to the range within which the current voltage being applied to the electrodynamic device at any particular time happens to fall. The stepped abutment formations have a width corresponding to the movement of the distal end of the arm 133 of the electrodynamic device within the limits of the several voltage ranges so that the abutment formation 129 will be positioned to engage the proper abutment formation of the bar 116 for any voltage within the particular range for which the selected abutment formation is provided. It will be noted that when the hook formation 129 is in engagement with the abutment formation 124 of the bar 116 the two field windings of each pair of field windings of the associated motor will be interconnected in parallel, as is shown in Figs. 1 and 8. When the hook formation 129 is in engagement with the abutment formation 125 the contacts 55' and 56' will be connected together, the contacts 54' and 57' will be disconnected from the other contacts while the contact 50' will remain connected to the contact 51' and the contact 52' will be connected to the contact 53' thereby connecting the windings of one pair in series with each other and the windings of the other pair in parallel, as shown in Fig. 2. When the hook formation 129 is in engagement with the abutment surface or formation 126 the contacts 55' and 56' will remain interconnected with the contacts 54' and 57' disconnected and the contacts 51' and 52' will be connected while the contacts 50' and 53' are disconnected so that, in this position of the bar 116, the two windings of each pair of field windings will be interconnected in series with each other, as shown in Fig. 3.

In the modified form of the invention the push button is in the form of a key with the button 93 mounted on the upper end of a stem 37' slidably supported for longitudinal movement by pins 136 and 137 extending respectively through slots 138 and 139 provided in the stem 37' at locations spaced apart longitudinally of the stem. An abutment pin 140 projects perpendicularly from the stem 37' near the end of the stem remote from the top or push button 93 and a tension spring 41, connected between the pin 140 and the pin 136, resiliently urges the key to its raised or upper limiting position. A lateral offset 142 of the stem 37' engages the actuating lever 143 of the switch 35 to change this switch, in the manner indicated above, when the key is depressed.

The abutment pin 140 rides on the upper edge of a lever 145 pivotally mounted at one end on a fixed pivot 146 and connected at its other end by a lost motion, pivotal connection 147, with the distal end of one arm 148 of a bellcrank lever 150 pivotally mounted at its angle on a fixed pivot 151. The bellcrank has a second arm 152 carrying at its distal end a perpendicularly projecting abutment pin 154 which is engageable with the perpendicularly projecting abutment formation 118 on the slide bar 116 to move the slide bar against the force of spring 130 when the push button or key 93 is manually depressed.

The arrangement is such, that when the push button is depressed to provide for an automatic adjustment of the motor to the coincidental current voltage, the slide bar 116 is moved to the left, as viewed in Fig. 8, until the terminal abutment formation 124 of the slide bar is disposed somewhat to the left of the hook formation 129, thereby freeing the arm 128 for substantially unresisted movement by the arm 133 of the electrodynamic device 132. The arm 133 of the electrodynamic device will then move the hook formation 129 to a predetermined position corresponding to the predetermined voltage range within which the coincidental voltage falls and, upon release of the button 93, the spring 130 will pull the slide bar 116 to the right, as viewed in Fig. 8, until one of the abutment formations 124, 125 or 126 of the bar 116 comes into engagement with the hook formation 129 to thereby position the bar 116 at the position predetermined for the particular voltage range and provide the predetermined parallel, series or parallel-series connection of the motor field windings, as described above.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An automatically adjustable variable voltage motor assembly comprising a motor having an even number of field coils arranged in pairs, a switch connected to said field coils and having different positions in one of which it interconnects the field coils of each of two pair of such coils in parallel with each other and in another of which it interconnects the coils of at least one of said pairs in series with each other, means responsive to the value of the voltage of the electric current supplied to said motor effective to urge said switch from one position to another, means releasably holding said switch against movement by said voltage responsive means, and manually operated means effective to release said holding means and free said switch for movement by said voltage responsive means.

2. An automatically adjustable variable voltage motor assembly comprising a motor having an even number of coils, a switch connected to said coils and having different positions in one of which it interconnects the coils in parallel with each other and in another of which it interconnects the coil in series with each other, a device responsive to the value of the voltage of the electric current supplied to said motor effective to move said switch from one position to another, a normally closed motor energizing circuit, a normally open energizing circuit for said device, and manually operated means effective to temporarily open said motor circuit and close the circuit for said device.

3. An automatically adjustable variable voltage motor assembly comprising a motor having at least two coils, a switch connected to said coils and having different positions in one of which it connects the coils in parallel with each other and in another of which it connects the coils in series with each other, a device having a portion movable in response to changes in the voltage of the current supplied to said motor from one range of voltages to another and connected to said switch to move said switch from one position to another in response to a change of the current voltage from one range to another, separate energizing circuits for said motor and said device, and manually operated means effective to alternatively close said circuits.

4. An automatically adjustable variable voltage motor assembly comprising a motor having at least two pair of field coils, a switch connected to said field coils and having different positions in one of which it connects the field coils of each pair in parallel with each other and in another of which it connects the field coils of at least one pair in series with each other, an electrodynamic device having a portion movable in response to changes in the voltage of the current supplied to said motor from one range of voltages to another and connected to said switch to move said switch from one position to another in response to a change of the current voltage from one range to another, and manually operated means effective to change the application of current from said motor to said electrodynamic device and simultaneously condition said switch for movement by said electrodynamic device.

5. An automatically adjustable variable voltage motor assembly comprising a motor having at least two windings, a switch connected to said windings and having different positions in one of which it connects the windings in parallel with each other and in another of which it connects the windings in series with each other, an electrodynamic device having a portion movable in response to changes in the voltage of the current supplied to said motor from one range of voltages to another and connected to said switch to move said switch from one position to another in response to a change of the current voltage from one range to another, said device being effective to position said switch to connect the windings in parallel with each other when said device is subjected to voltage in a range of predetermined limits and to position said switch to connect the windings in series with each other when said device is subjected to a voltage within a second voltage range of predetermined limits higher than the limits of said first range, means releasably holding said switch against movement by said electrodynamic device, a normally closed motor energizing circuit, a normally open electrodynamic device energizing circuit, a second switch connected into said circuits and effective when operated to open said motor circuit and close said electrodynamic device circuit, and manually operated means effective to release said holding means and free said switch for movement by said electrodynamic device and simultaneously operate said second switch to energize said electrodynamic device.

6. An automatically adjustable variable voltage motor assembly comprising a motor having at least two pair of field windings, a switch connected to said field windings and having different positions in one of which it connects the field windings of each pair in parallel with each other and in another of which it connects the field windings of at least one pair in series with each other, a device having a portion movable in response to changes in the voltage of the current supplied to said motor from one range of voltages to another and connected to said switch to move said switch from one position to another in response to a change of the current voltage from one range to another, said device being effective to position said switch to connect the field windings of each pair in parallel with each other when said device is subjected to voltage in a first range of predetermined limits and to position said switch to connect the field windings of at least one pair of field windings in series with each other when said device is subjected to a voltage within a second voltage range of predetermined limits higher than the limits of said first range, said switch being normally held against movement by said device, and manually operated means effective to temporarily release said switch for movement by said device.

7. An automatically adjustable variable voltage motor assembly comprising an electric motor having at least two pair of field windings, an energizing circuit normally connected to said motor, a changeable switch connected between said energizing circuit and said field windings and having different positions in one of which it connects the field windings of each pair in parallel with each other and in another of which it connects the field windings of at least one pair in series with each other, an electrodynamic device having a movable part connected to said switch and effective to urge said switch to said one position when said device is subjected to a voltage within a predetermined range of voltages and to urge said switch to the other position when said device is subjected to a voltage within a predetermined higher range of voltages, said switch being normally held against movement by said device and said device being normally disconnected from said energizing circuit, manually operated means effective when operated to temporarily free said switch for movement by said device, and a second switch actuated by said manually operated means to temporarily disconnect said motor from said energizing circuit and connect said energizing circuit to said electrodynamic device.

8. A motor and switch assembly comprising an electric motor having at least two pair of field windings, means normally connecting an energizing circuit to said motor, a switch connected to said field windings and having at least three positions in the first of which it connects the field windings of each pair in parallel with each other, in the second of which it connects the field windings of one pair in parallel with each other and the field windings of the other pair in series with each other, and in the third of which it connects the field windings of each pair in series with each other, an electrodynamic device having a movable switch changing portion and effective when subjected to a voltage within a predetermined lower range of voltages to move said switch to said first position, when subjected to a voltage within a predetermined intermediate range of voltages to move said switch to said second position, and when subjected to a voltage within a predetermined higher range of voltages to move said switch to said third position, said switch being normally held against movement from one position to another and said electrodynamic device being normally disconnected from said energizing circuit, manually operated means effective when operated to release said switch for movement by said device, and a second switch actuated by said manually operated means to disconnect said motor from said energizing circuit and connect said electrodynamic device thereto simultaneously with the release of the first-mentioned switch for movement.

9. A variable position switch assembly comprising a first elongated member of electrically insulative material, electrical contacts carried in spaced-apart relationship by said first member, a second elongated member of electrically insulative material adjacent to and movable in both directions along said first member, electrical connectors carried by said second member and engageable with said contacts to interconnect said contacts in different combinations as said second member moves to different positions along said first member, and an electrodynamometer connected to said second member and effective in response to variations in the voltage of an electric current applied thereto to move said second member from one position to another along to said first member.

10. A variable position switch assembly comprising a first member of electrically insulative material, electrical contacts carried in spaced-apart relationship by said first member, a second member of electrically insulative material adjacent to and movable relative to said first member, electrical connectors carried by said second member and engageable with said contacts to interconnect said contacts in different combinations as said second member moves to different positions relative to said first member, an electrodynamic device effective in response to variations in the voltage of an electric current applied thereto to establish different positions of said second member relative to said first member, means releasably holding said second member against movement relative to said first member, and manually operated means effective to release said holding means and free said second member for movement to the positions thereof relative to said first member as established by said electrodynamic device.

11. A variable position switch assembly comprising a first member of electrically insulative material, electrical contacts carried in spaced-apart relationship by said first member, a second member of electrically insulative material adjacent to and movable relative to said first member, electrical connectors carried by said second member and engageable with said contacts to interconnect said contacts in different combinations as said second member moves to different positions relative to said first member, an electrodynamic device effective in response to variations in the voltage of an electric current applied thereto to establish different positions of said second member, said second member being normally held against movement relative to said first member, and manually operated means effective to condition said second member for movement to the positions thereof relative to said first member as established by said electrodynamic device, and a switch actuated by said manually operated means controlling the supply of electric current to said electrodynamic device.

References Cited in the file of this patent

UNITED STATES PATENTS

| | | |
|---|---|---|
| 2,157,417 | Kneisley | May 9, 1939 |
| 2,445,434 | Hornbarger | July 20, 1948 |
| 2,613,343 | Ober | Oct. 7, 1952 |
| 2,692,363 | Moody et al. | Oct. 19, 1954 |

UNITED STATES PATENT OFFICE

CERTIFICATE OF CORRECTION

Patent No. 2,807,766                                          September 24, 1957

John L. Moody et al.

It is hereby certified that error appears in the printed specification of the above numbered patent requiring correction and that the said Letters Patent should read as corrected below.

Column 4, line 67, for "increase" read -- increases --; column 7, line 54, for "form" read -- from --; column 8, line 15, for "slots" read -- slot --; column 9, line 13, for "41" read -- 141 --; column 10, line 6, for "coil" read -- coils --; column 12, line 21, strike out "to".

Signed and sealed this 3rd day of December 1957.

(SEAL)
Attest:

KARL H. AXLINE
Attesting Officer

ROBERT C. WATSON
Commissioner of Patents